Nov. 7, 1961 A. FURIA ET AL 3,007,447
IMPROVEMENTS IN HYDRAULIC LIFT SYSTEMS
Filed Nov. 12, 1959 7 Sheets-Sheet 1
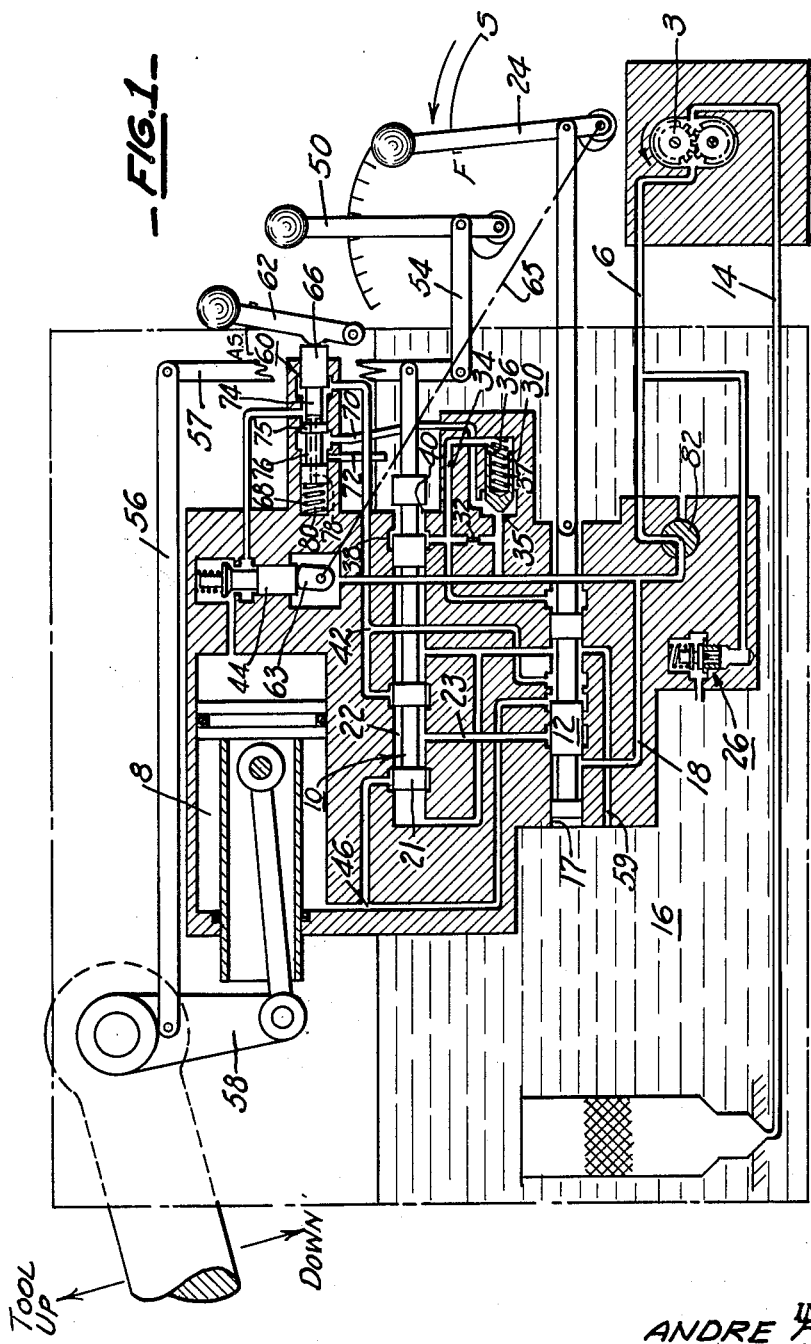
INVENTORS
ANDRE FURIA
GERARD CHEVREUX
BY
John A. Young
ATTORNEY

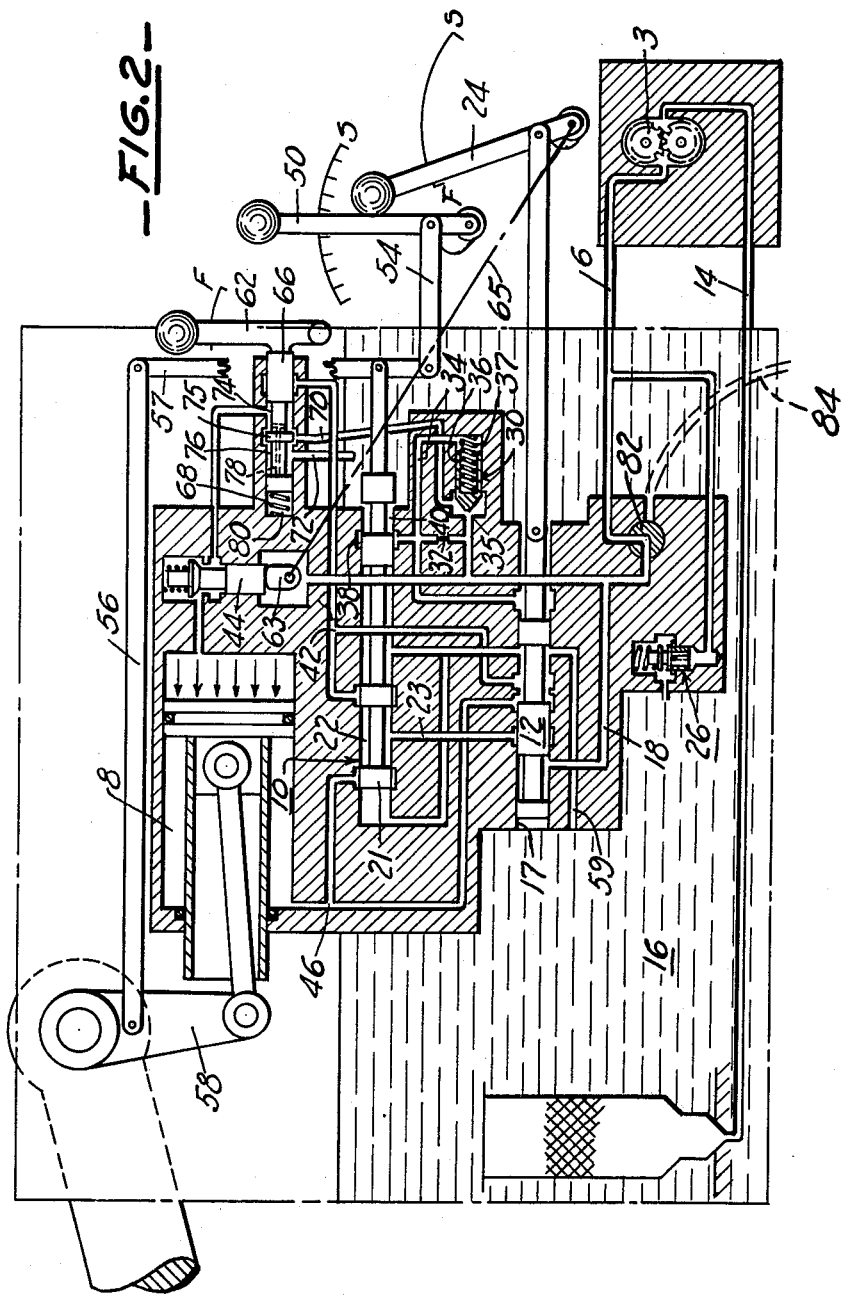

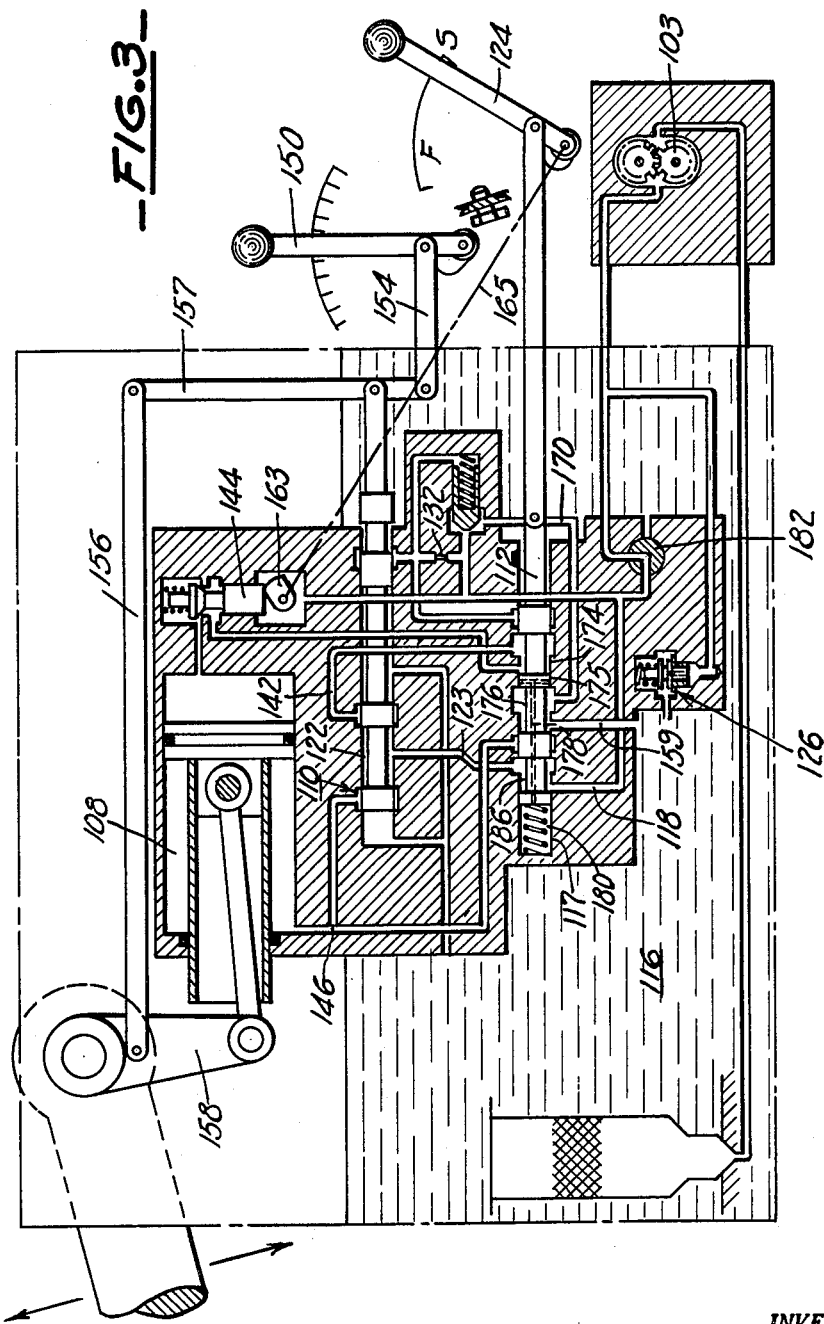

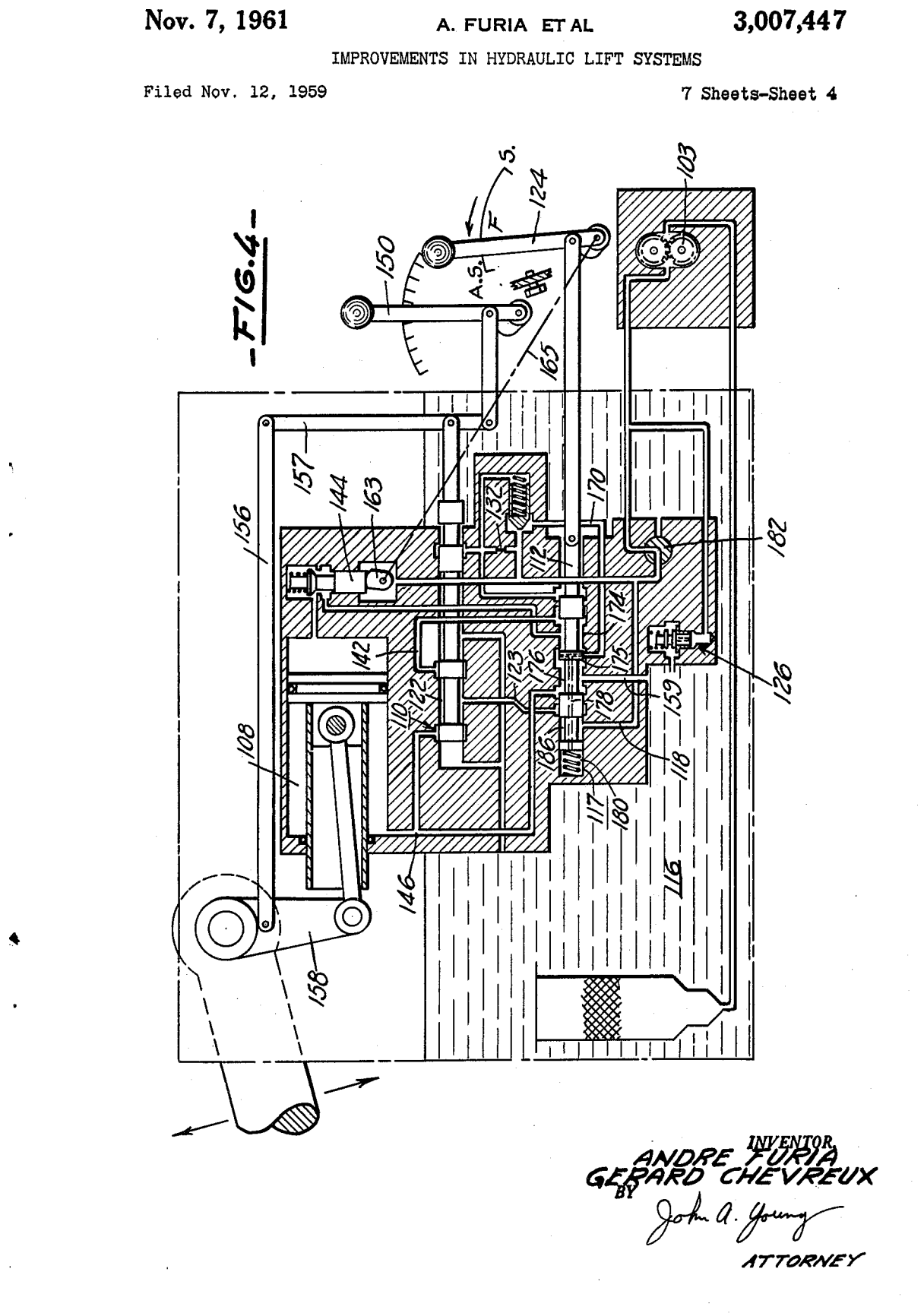

Nov. 7, 1961  A. FURIA ET AL  3,007,447
IMPROVEMENTS IN HYDRAULIC LIFT SYSTEMS
Filed Nov. 12, 1959  7 Sheets-Sheet 4

INVENTOR
ANDRE FURIA
GERARD CHEVREUX
BY
John A. Young
ATTORNEY

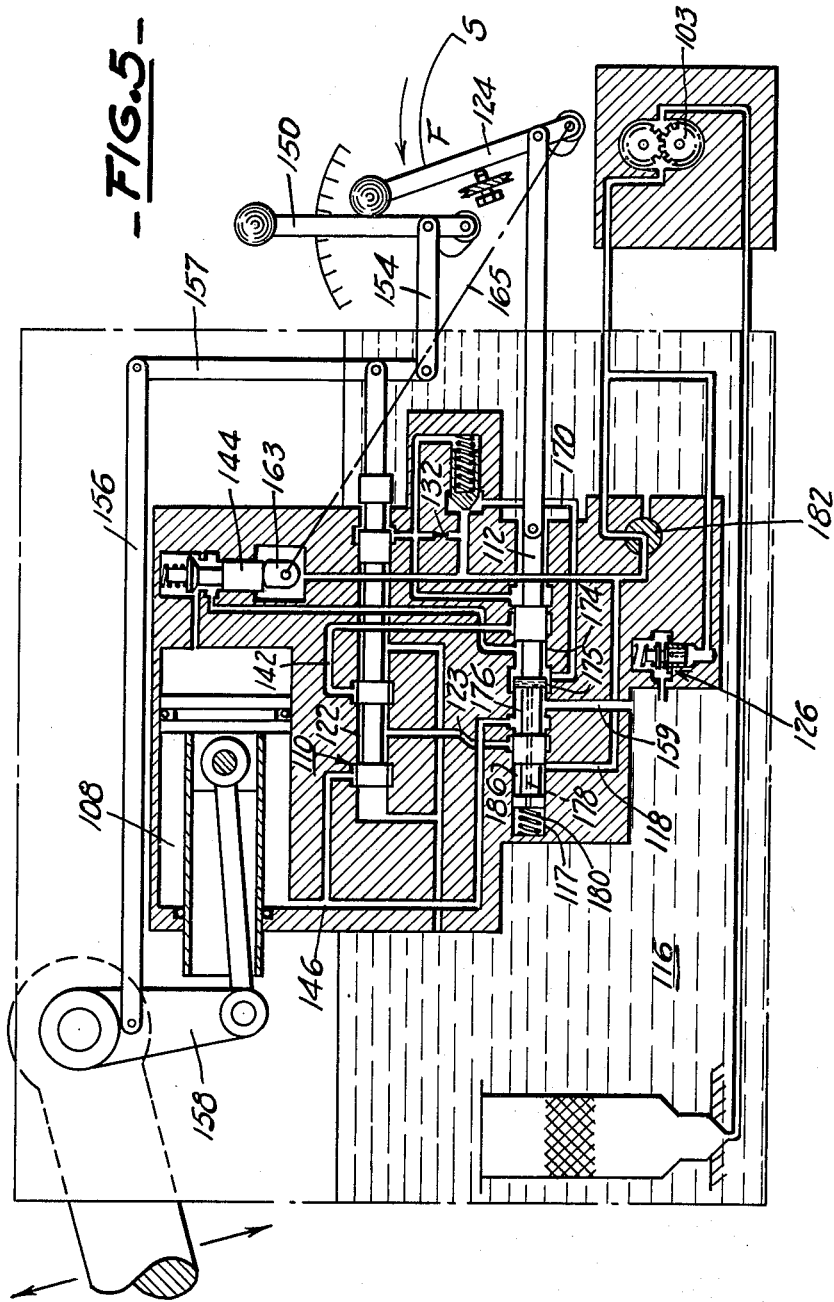

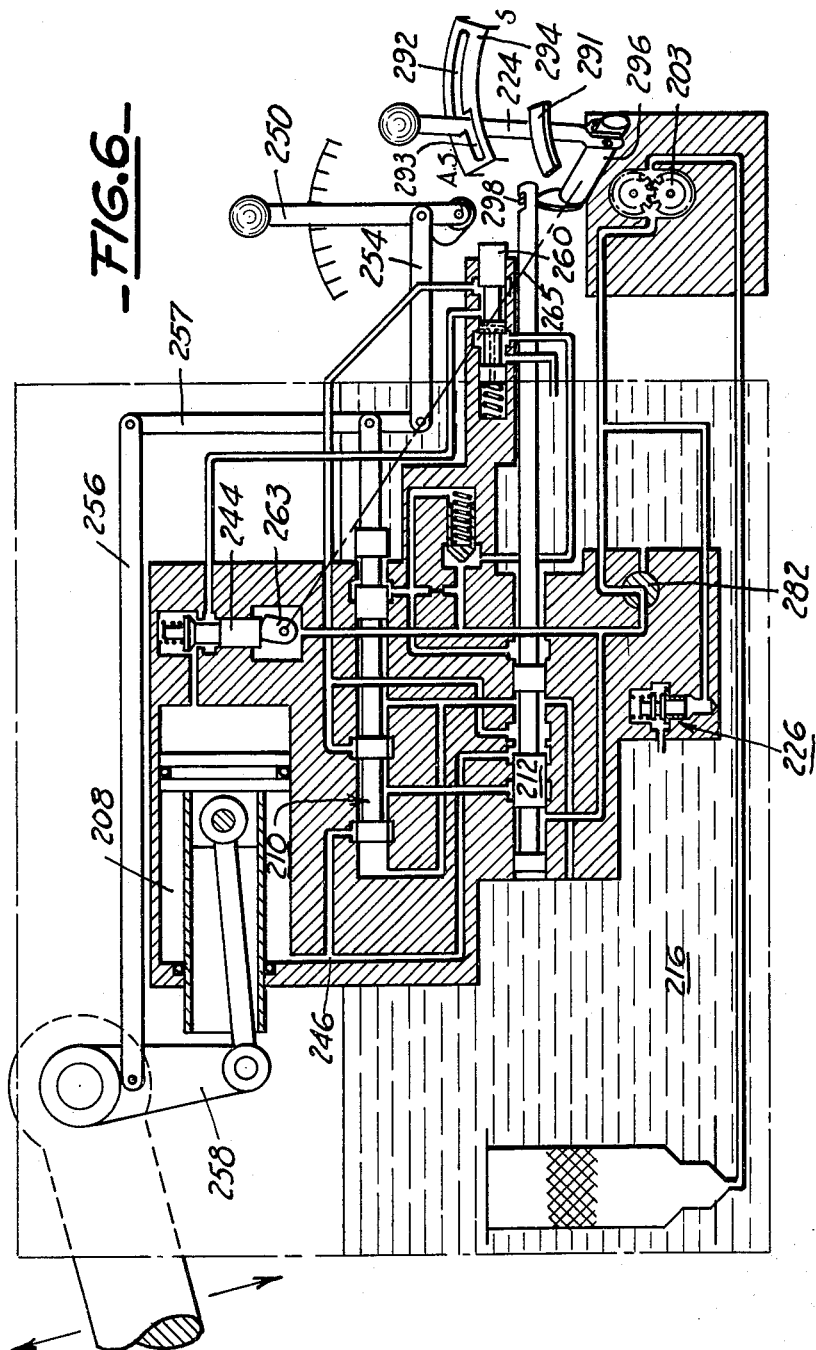

Nov. 7, 1961   A. FURIA ET AL   3,007,447
IMPROVEMENTS IN HYDRAULIC LIFT SYSTEMS
Filed Nov. 12, 1959   7 Sheets-Sheet 7
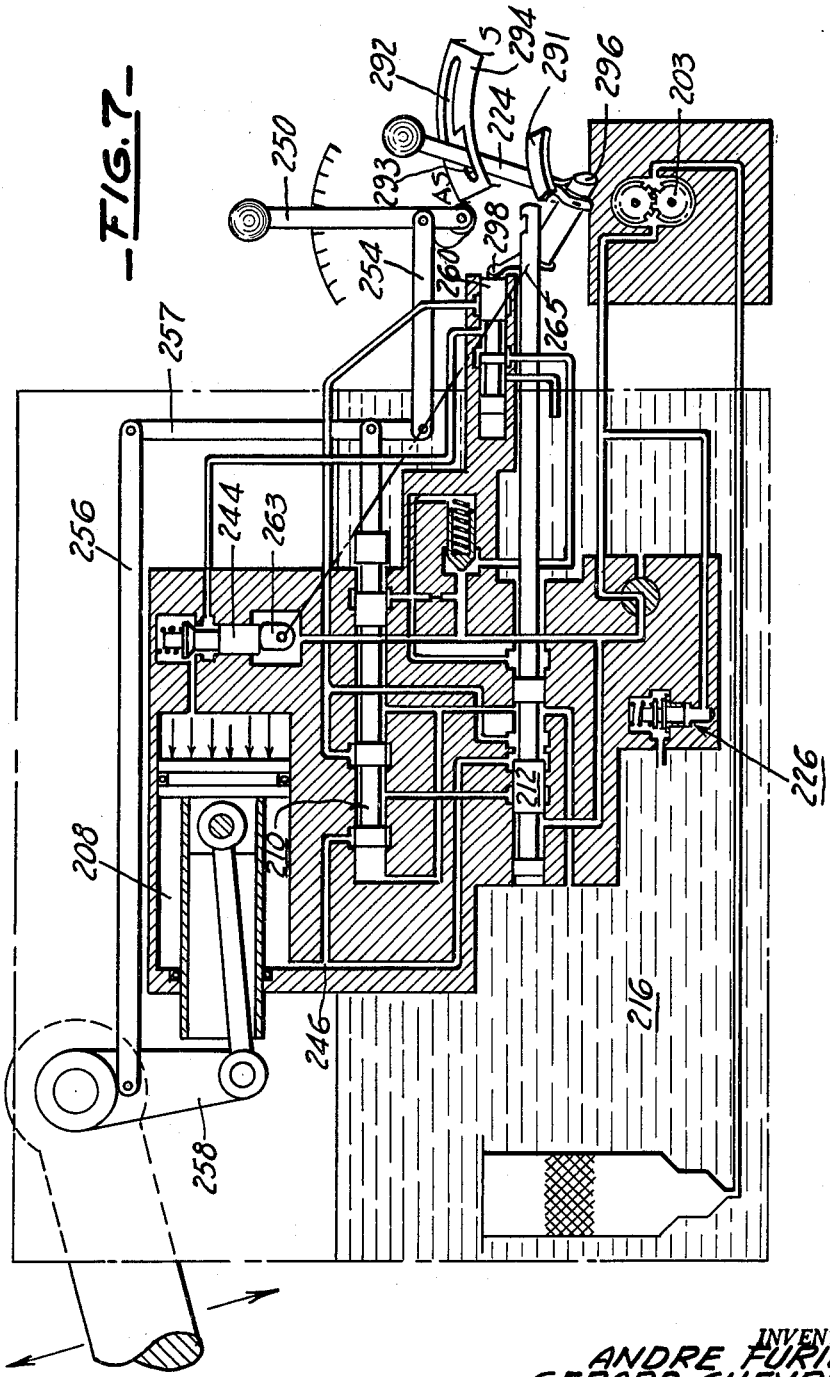
INVENTOR.
ANDRE FURIA
GERARD CHEVREUX
BY
*John A. Young*
ATTORNEY

United States Patent Office 3,007,447
Patented Nov. 7, 1961

3,007,447
IMPROVEMENTS IN HYDRAULIC LIFT SYSTEMS
André Furia, Neuilly, and Gerard Chevreux, Colombes, France, assignors to Societe Anonyme D.B.A., Paris, France, a corporation of France
Filed Nov. 12, 1959, Ser. No. 852,280
14 Claims. (Cl. 121—41)

The invention relates to hydraulic systems and more particularly to improvements in hydraulic lift systems for use on agricultural tractors or the like.

It is an object of the invention to provide a system of the aforementioned type which permits the tractor driver to raise and lower an agricultural implement and also to exert an adjustable limited raising force on the implement in order to momentarily transfer a part of the weight thereof onto the rear axle of the tractor.

It is a further object of the invention to provide a hydraulic lift system having a double acting hydraulic motor in which the pressure is controlled in either chamber thereof by a control valve and in the "raising" chamber thereof by a manually actuated anti-slip valve which maintains the "lowering" chamber of the motor to discharge when energized.

It is another object of the invention to provide improved control valve means for hydraulic systems comprising a depth control valve which automatically maintains the agricultural implement at depth settings corresponding to the position of manually located means, a "floating" valve which in a "floating" position disables said depth control valve and an anti-slip valve which when brought in operative position develops pressure in the "raising" chamber only of the lift motor, while communicating the other chamber to discharge.

It is still another object to provide an anti-skid valve which in one end position sets the depth-control into operation, in an intermediate operation communicates both chambers to discharge and in an extreme position communicates a pressure in relation with the force executed thereon to the "raising" chamber while maintaining the lowering chamber to discharge.

Other objects and advantages of the invention will appear in the following description which refer to the accompanying drawings which form a part of the specification and in which:

FIGURE 1 is a schematic diagram of a hydraulic lift system of the follow-up type embodying an anti-skid valve put into operation by a separate handle, distinct from the handle which controls the distributor valve and from the handle which controls operation of a floating valve spool, the parts of the system being shown in the position corresponding to floating operation;

FIGURE 2 is a schematic diagram similar to FIGURE 1, but showing the elements in a different position of operation (anti-slip);

FIGURE 3 is a diagram showing a modified form of the hydraulic lift system, wherein the movable element of the anti-slip valve is combined with the floating valve spool, the parts being shown in the position corresponding to "servo" operation;

FIGURE 4 is a diagram similar to FIGURE 3 but showing the elements of the system in a different position of operation ("floating" operation).

FIGURE 5 is a diagram similar to FIGURE 3 but showing the elements of the system in a different position of operation (anti-slip valve energized);

FIGURE 6 is a diagram showing another modification of the system shown in FIGURE 1, wherein the handle which actuates the "floating" valve spool is guided by a grid which maintains the lever in either of two angularly spaced planes, the elements being shown in the position corresponding to "floating" operation;

FIGURE 7 is a diagram similar to FIGURE 6 but showing the parts in a different position of operation (anti-slip).

Referring first to FIGURE 1, the hydraulic lift system therein disclosed comprises a pump 3, a double acting piston and cylinder comprising a motor 8, a follow-up control valve 10 and a "floating" valve. Pump 3 delivers the rate of flow required to rapidly actuate the lift motor 8. The follow-up control valve 10 controls fluid flow to and from the motor 8. The opposed chambers of the hydraulic cylinder may be either connected or separated by means of the "floating" valve having a floating valve spool 12 slidably received in a bore 17 and actuated by a handle 24.

The pump draws fluid from a reservoir 16 through an inlet pipe 14 and discharges it into a pressure line 6. The reservoir 16 may preferably be formed as an enclosure (framed in dotted lines on the figures) which accommodates the complete hydraulic unit.

A branch 18 of the pressure line 6 opens in the bore 17 of the "floating" valve. The control valve 10, which controls up and down movement of the agricultural implement carried by the tractor, comprises a distributor member 21 slidably received in a bore of the valve housing. A portion of reduced diameter on the distributor member delimits a central chamber 22 in which opens a passage 23 which terminates in the bore 17 of the floating valve. The reduced diameter portion is large enough to be continuously in registration with the opening of passage 23 throughout the range of displacement of the distributor member.

As long as handle 24 which actuates the floating valve spool 12 is in its "servo" position (indicated by the reference letter S on FIGURE 1), the spool 12 maintains a communication between the branch 18 and the passage 23. But no communication exists between the central chamber 22 and the cylinder chambers as long as the control valve is in its central or "neutral" position.

The pressure in the hydraulic system is controlled by automatic valve means of the type described in our copending patent application Ser. No. 822,087, filed June 22, 1959. A relief valve 26 loaded by a prestressed spring limits the pressure in line 6 to a maximum predetermined value and opens a throttled flow from line 6 to reservoir 16 if the fluid pressure raises beyond this value.

The fluid discharged by pump 3 into line 6 exerts a pressure force on the front end face of an automatic discharge valve member 30. Pressure line 6 is connected to the rear chamber of poppet 30 by a drilling 34 having a restricted passage 32. The rear chamber of the poppet is communicated with a counterbore 36 in the control valve bore.

Fluid flow across the restricted passage 32 is sufficiently restricted to develop a differential pressure between the opposite end surfaces of valve member 30. The pressure force on the valve member overcomes the compression of a light closure spring 36 and lifts the valve member 30 off its seat 35. The pressure line 6 has then a substantially unrestricted communication with a return line 70 which opens downstream of the seat 35. When the control valve 10 is in neutral position, counterbore 38 is communicated to the reservoir by passage means comprising an annular groove 40 of the valve spool which is then in overlapping relation with counterbore 38 (FIGURES 1 and 2); a fluid flow occurs in a circuit comprising the restriction 32; the resultant differential pressure against valve member 30 lifts it from its seat and the pump is thereby unloaded.

The passage of the system from rest into working condition occurs as soon as the control valve is moved in either direction from its normal position. If the distributor member of the control valve 10 is moved to the left from the position shown on FIGURE 1 (with the handle 24 in "servo" position) the right hand chamber of the power cylinder is communicated to the reservoir through the non-return valve 44, an anti-slip valve 60 and passages 42 and 59. The anti-slip valve 60 maintains free communication between the return line 70 and the reservoir as long as the anti-slip valve is in normal (inoperative) condition. At the same time the left hand chamber of the power cylinder is communicated to passage 23 which leads to the pressure branch 18. The fluid pressure which prevails in the left hand chamber of the cylinder 8 then applies a downward pressure on the implement so as to sink it in the ground.

On the contrary, if the distributor member 21 is moved to the right, it communicates the central chamber 22 with passage 23 and with the pump, while passage 46 is communicated to passage 59 and to the discharge reservoir. The fluid pressure in the right hand chamber of the cylinder then raises the implement. In the latter case the pump pressure acts on the whole cross section of the cylinder piston and exerts maximum force.

When distributor member 21 is moved in either direction, one of the two lands which delimit groove 40 closes off the communication between the piloted discharge valve and the discharge reservoir. The pressure loss across restricted passage 32 falls to zero as the fluid flow in the circuit is cut off. The pressures acting on the opposed end faces of valve member 30 become equal and the light spring 36 biases valve member 30 toward its seat 35. As soon as initial abutment takes place an increasing pressure force cooperates with the compression of spring 36 to force the valve member against its seat: the fluid pressure delivered by pump 3 acts on the rear end face of the valve member on the whole cross section thereof, while the annular outer portion of the front end face is subject to the reservoir pressure.

Distributor member 21 is actuated by means of a handle 50. Handle 50, raising arm 58 and distributor member 21 are interconnected by a follow-up linkage comprising a beam 57 pivotally connected at its upper end to a drag link 56 attached to the raising arm, at its lower end to a link 54 attached to handle 50 and intermediate its ends to the distributor member 21. The follow-up linkage restores the control valve into its neutral position when the implement takes a position corresponding to that of the handle.

In order to change the operating conditions from "servo" to "floating" (normal working condition) the driver pushes handle 24 from position S to position F, as shown on FIGURE 1. In the new position of floating valve spool 12, a by-pass communication is opened between the passages 46, 42 and the reservoir. At the same time the right-hand land of the floating valve spool 12 opens a free communication between the rear end face of valve member 30 and the discharge reservoir. The pump pressure acting on the central portion of the front face of valve member 30 forces the valve member off its seat and unloads pump 3; as the reservoir pressure then prevails in line 6, a cam 63 for lifting the movable element of non-return valve 44 must be provided which cam is mechanically connected to handle 24 or valve spool 12. A positive connection 65 between cam 63 and handle 24 is indicated in dot-dash lines on FIGURE 1.

Anti-slip valve 60 is located between passage 42 and non-return valve 44. The anti-slip valve 60 has a plunger 66 controlled by a handle or pedal 62 and slidably received in a bore of the common housing of all valves. A light return spring 68 biases the plunger toward a position wherein it causes unrestricted communication between passage 42 and the right hand chamber of motor 8 across non-return valve 44. Said passage 42 is connected to the reservoir through a by-pass passage, floating valve 12 and line 59, when handle 24 is in position F as shown on FIGURE 1.

The bore of the anti-slip valve is formed with two recesses in which respectively open the passageway 70 leading to the front face of the piloted discharge valve and the passage 42. A line leading to non-return valve 44 opens in the bore wall between the recesses, and a discharge passage 72 leading to the return reservoir opens in the bore wall beyond the forward recess; when the valve plunger is in its normal (inoperative) position as shown on FIGURE 1, a first circular groove 74 formed in valve plunger 66 communicates line 42 with the cylinder chamber through nonreturn valve 44 while a second circular groove 76 communicates passageway 70 and discharge passage 72.

When handle 62 is moved toward the "anti-slip" position A.S. as shown on FIGURE 2 (the floating valve spool 12 being in its "floating" position), the enlarged right hand end portion of the plunger overlaps the recess in which passage 42 opens, thereby closing off the communication between motor 8 and passage 42. At the same time a narrow land 75 formed on plunger 66 between grooves 74 and 76 is moved beyond the right hand edge of the recess in which passageway 70 opens, thereby communicating motor 8 with passageway 70. Further movement of the plunger to the left causes the narrow land to approach the left hand edge of the recess and to throttle the fluid flow between passageway 70 connected to the pump and discharge passage 72. Valve member 30 is maintained clear of its seat by the fluid pressure differential acting thereon, as its rear face is connected to the reservoir by the floating valve while its front face is subject to the pump pressure.

The actuation of the hydraulic restriction causes the pump pressure to increase in an adjustable amount. The maximum pressure increase is determined by the maximum stroke of lever 62 from rest and an adjustable stop member (not shown) may conveniently be provided for this purpose. The stop is preferably set for a maximum anti-slip pressure in the range of 25% of the work pressure.

It is to be noted that restricted passage 32 "shunts" the anti-slip valve; but the cross section of this passage is not small enough to disturb control by the anti-slip valve and in addition has an advantageous effect in damping the pressure surge which would result from a brutal actuation of the anti-slip handle 62.

The right hand end face of the fluid motor 8 is subject to a pressure adjustable by means of handle 62, while the left-hand end face is not subject to any pressure force as the left hand chamber is then communicated to the reservoir through passage 46, bore 17 and passage 59. Hydraulic fluid under pressure in the right hand chamber exerts a pressure force on the piston which is not balanced by a corresponding force acting on the other piston face and a lifting force is exerted by the piston on the ground working implement. This force is insufficient to unground the implement, but causes a transfer of part of the implement weight onto the rear axle. In order to give the driver a "feel" of the load increase on the rear axle, spring 68 is given a very low stiffness but is associated with pressure reaction means which deliver a reaction force in direct relationship with the pressure in the right hand chamber of fluid motor 8. A drilling 78 in the plunger 66 communicates the first groove 74 with an end chamber 80 limited by an enlarged left hand end portion of the valve member. Since the other pressure forces acting against valve plunger 66 balance each other, the resultant force transmitted to the driver is in direct relationship with the anti-slip pressure.

As soon as a normal adherence has been resumed, the driver releases handle 62, which is moved back to its normal position by the reaction pressure and the compression force of spring 68: The system comes back to "floating" condition.

A two-position, three way valve 82 may conveniently be provided to feed auxiliary devices 84 (FIGURE 2). If the system is in floating condition, no initial pressure exists in the system. But as soon as communication of the pump with the reservoir is cut off and a counter-pressure is developed by the motor to be fed, the pump pressure increases up to the necessary value.

The hydraulic lift system as shown on FIGURES 3, 5 is a second embodiment of the invention and the members corresponding to those already described will bear the same reference numeral increased by 100. The main difference between the two embodiments resides in that the anti-slip valve of the second embodiment is combined with the floating valve. This construction improves upon that shown on FIGURES 1–2 in respect of simplification in construction.

Referring to FIGURE 3, the narrow land 175 which throttles the hydraulic fluid flow discharged by the pump separates two grooves 174 and 176 of the floating valve spool. Opposite edges of the grooves are formed by two lands corresponding to those on valve spool 12 on FIGURE 1. When the valve is in its floating position (FIGURE 4), the narrow land 175 is in registry with a larger counterbore in the wall of bore 117 so that a free communication is maintained between grooves 174 and 176 which then uncover by-pass passages connected to the opposed chambers of the power cylinder.

FIGURE 3 shows the floating valve spool in its "servo" position. Passages 146 and 142 are closed off by lands of spool 112, the first groove 174 communicates passage 142 to non-return valve 144 and passage 146 is closed off by one of the lands which limit groove 176. Another groove 186 formed on spool 112 beyond the last named land communicates pressure branch 118 with passage 123 which opens in the central chamber 122 of the control valve. Groove 176 communicates passageway 170 with the return passage 159. Fluid admission and exhaust from the power cylinder are thus controlled by control valve 110.

When handle 124 is brought to its floating position F (FIGURE 4) the hydraulic connections are changed: The narrow land 175 comes in register within the counterbore of bore 117, in which passage 170 opens, thereby communicating grooves 174 and 176 connected to the chambers of the power cylinder. At the same time groove 176 communicates passage 146 with the discharge passage 159 so that both cylinder chambers are open to the reservoir, since a cam 163 mechanically actuated by lever 124 opens the non-return valve 144 when handle 124 is in its floating position.

If lever 124 is forced beyond the floating position to the anti-slip position of FIGURE 5, land 175 approaches the left hand edge of its associated counterbore and partially closes off communication between groove 174 connected to the pump and groove 176 connected to the reservoir. The pump pressure prevailing in groove 174 increases by an amount determined by the pressure loss through the restriction and is communicated to the right hand chamber of the power cylinder while the left hand chamber remains at the reservoir pressure. A raising force is exerted on the ground working implement and a portion of the tool weight is transferred onto the rear axle of the tractor.

A reaction producing device associated with the valve comprises an end chamber 180 closed by the enlarged end portion of the floating valve spool 112; a drilling 178 provided in the valve spool communicates chamber 180 with the peripheral surface of narrow land 175, so that the same pressure prevails in chamber 180 and in groove 174 when the valve spool is in its anti-skid position. The pressure force acting on the spool in chamber 180 gives the driver a "feel" which reflects the proportion of the weight of the implement transferred onto the rear axle. As the drilling opens at the peripheral surface of land 175 which contacts the bore wall during servo operation, there is no reaction build-up then.

Restricted passage 132 communicates the power cylinder with the reservoir and "shunts" the anti-slip restriction between land 175 and its associated counterbore. However, no operating trouble results from this construction as the anti-slip pressure delivered by the anti-slip valve remains lesser than 25% of the maximum working pressure, and the pressure loss which would result from the complete flow restricted passage 132 would be far higher.

The further embodiment shown on FIGURES 6–7 is similar to that shown on FIGURES 1–2 and the members on FIGURES 6–7 corresponding to those already described with reference to FIGURES 1–2 will bear the same reference numeral increased by 200.

The embodiment on FIGURES 6–7 is characterized in that a single handle 224 successively controls a floating valve spool and an anti-slip valve plunger. For this purpose the lever is arranged so as to be movable in two successive planes when it is brought from its normal servo position into its anti-slip position. Movement of the handle is guided by a S-shaped slot cut in a grid 294 through which handle 224 projects. The S-shaped slot has two parallel arms 292 and 293 and the handle fulcrums on an abutment 291 as it is moved beyond the end of arm 292. The forked lower end of handle 224 straddles a shaft 296 and is pivoted thereon; the shaft is adapted to be rotated responsive to movement of the handle along an arm of the slot and to be longitudinally shifted responsive to rocking movement of the handle from one arm to the other. As long as handle 224 projects through arm 292, a finger 298 terminating the shaft engages the floating valve spool 212 (FIGURE 6). When handle 224 is moved into arm 293 (FIGURE 7), finger 298 leaves valve spool 212 (which remains in its floating position) and engages the plunger of anti-slip valve 260, whose operation is similar to that of the valve 60 on FIGURES 1–2.

Although a number of embodiments only have been shown and described, it is our intention to cover thereby all novel adaptations, modifications and arrangements thereof coming within the practice of those skilled in the art to which the invention relates.

What we claim is:

1. In an agricultural tractor or the like having a hydraulic cylinder containing a movable piston which drives an implement, first and second conduit means respectively communicating with the opposed sides of the piston, and control valve means having an inlet port and means for alternatively communicating said inlet port to said first and second conduit means; valve means having a pressure supply port, an outlet port which communicates with said pressure inlet port, a return port which communicates with a return reservoir and control means which when in one condition communicates said pressure supply and outlet ports, when in another condition closes off said pressure supply port while communicating said first and second conduit means together and with said reservoir, and anti-slip means which in normal condition maintains unrestricted hydraulic communication between said valve means and both sides of said piston and in energized condition modulates the pressure prevailing in one of said conduit means and against the corresponding side of said piston.

2. In an agricultural tractor or the like having a hydraulic cylinder containing a movable piston which drives an implement, first and second conduit means respectively communicating with the opposed sides of the piston, and a control valve having an inlet port and means for alternatively communicating said inlet port to said first and second conduit means; valve means having a pressure supply port, an outlet port which communicates with said pressure inlet port, a return port which communicates with a return reservoir and control means which when in one condition communicates said pressure supply and outlet ports, when in another condition closes off said pressure supply port while communicating said first and second conduit means together and with said reservoir, and anti-slip means located on one of said conduit means which in normal condition maintains unrestricted hydraulic communication between said valve means and said cylinder and in energized condition modulates the pressure prevailing in said one conduit means downstream of said anti-slip means and against the corresponding side of said piston.

3. In an agricultural tractor or the like, a cylinder, a piston mounted for slidable movement in said cylinder and having opposite sides formed as different effective fluid pressure areas, first conduit means communicating with the side of the piston having the larger area and second conduit means communicating with the side of said piston having the smaller area and control valve means having a pressure inlet port and means for alternatively communicating said inlet port to said first and second conduit means; valve means having a pressure supply port which communicates with a pressure source, an outlet port which communicates with said pressure inlet port, a return port which communicates with a reservoir; control means which when in one condition communicates said pressure supply and outlet ports, when in another condition closes off said pressure supply port while said first and second conduit means together and with said reservoir; and anti-slip means which in normal condition maintains unrestricted communication between said valve means and said cylinder and in energized condition closes off said first conduit means, controls a hydraulic restriction between said conduit means downstream of said anti-slip means and said reservoir and opens free communication between said pressure source and said conduit means downstream of said anti-slip means for modulating pressure against the larger side of said piston.

4. In an agricultural tractor or the like having a cylinder containing a piston, first and second conduit means respectively communicating with the opposite sides of said piston and a control valve having an inlet port and means for alternatively communicating pressure from said inlet port to said first and second conduit means: valve means having a pressure supply port, an outlet port that communicates with said inlet port, and first and second by-pass ports which respectively communicates with said first and second conduit means; control means which when in one condition communicates said pressure supply and outlet ports while preventing communication between said by-pass ports, and when in another condition closes off said pressure supply port while communicating said by-pass ports and communicating them to a discharge reservoir, and means located on one only of said conduit means for modulating pressure against the corresponding side of said piston only.

5. In an agricultural tractor or the like, a cylinder, a piston mounted for slidable movement in said cylinder and having opposite ends formed as different effective fluid pressure areas, first conduit means communicating with the side of said piston having the larger area, and second conduit means communicating with the side of said piston having the smaller area, and a control valve having a pressure inlet port and means for alternatively communicating pressure from said inlet port to one of said first and second conduit means while communicating the other of said first and second conduit means to a return reservoir: valve means having a pressure supply port, an outlet port that communicates with said pressure inlet port, and first and second by-pass ports which respectively communicate with said first and second conduit means; control means which when in one condition communicates said pressure supply and pressure inlet ports while preventing communication between said by-pass ports, and when in another condition closes off said pressure supply port while communicating said by-pass ports to reservoir, and means located on said first conduit means for modulating pressure downstream thereof while maintaining free flow in said second conduit means.

6. In an agricultural tractor or the like having a hydraulic cylinder containing a movable piston which drives a ground working implement, first and second conduit means respectively communicating with the opposed sides of the piston and a control valve having an inlet port and means for alternatively communicating said inlet port to said first and second conduit means while communicating said second and first conduit means to a return reservoir: valve means having a pressure supply port, an outlet port which communicates with said inlet port, and first and second by-pass ports which respectively communicate with said first and second conduit means, manually actuated means which when in one position communicates said pressure supply and outlet ports while preventing communication between said by-pass ports, when in another position closes off said pressure supply port and communicates said first and second by-pass ports together and with said reservoir, and when in a position beyond said second position modulates pressure to one of said conduit means while maintaining the other of said conduit means in communication with the return reservoir.

7. In an agricultural tractor or the like having a hydraulic cylinder containing a movable piston which drives a ground working implement, first and second conduit means respectively communicating with the opposed sides of the piston and a control valve having an inlet port and means for alternatively communicating said inlet port to said first and second conduit means while communicating said second and first conduit means to a return reservoir: valve means having a pressure supply port, an outlet port which communicates with said inlet port and manually actuated control means which when in one position communicates said pressure supply and outlet ports, when in another position closes off said pressure supply port and communicates said first and second conduit means together and with said reservoir, and when in a position beyond said second position modulates pressure to one of said conduit means while maintaining the other of said conduit means in communication with the return reservoir.

8. In an agricultural tractor or the like having a hydraulic cylinder containing a movable piston which drives a ground working implement, first and second conduit means respectively communicating with the opposed sides of the piston and a control valve having an inlet port and means for alternatively communicating said inlet port to said first and second conduit means while communicating said second and first conduit means to a return reservoir: valve means having a pressure supply port, an outlet port which communicates with said inlet port, means for manually actuating said valve means and having first, second and third grooves of said valve means, and a movable valve member having one position which communicates said pressure supply and outlet ports, when in another position having a land between said first and second groove which closes off said pressure supply port and having said second and third grooves which communicate said first and second conduit means together and with said reservoir, and when in a position beyond said second position having a narrow land between said second and third grooves which modulates pressure to one of said conduit means.

9. In an agricultural tractor as set forth in claim 1, pressure reaction means including a chamber limited by an operator-actuated element of the anti-slip means and communicated with said one conduit means, whereby a reaction force in direct relation with the anti-slip pressure in said one conduit means is transmitted to the operator.

10. In an agricultural tractor lift system having a double acting power cylinder containing a movable piston which drives an implement, first and second conduit means respectively communicating with the opposed sides of the piston, a control valve for controlling pressure in said conduit means, pressure-producing means, and a reservoir: valve means actuated independent from the control valve, said valve means when in one position communicating fluid pressure to said control valve, when in another position closing off admission of fluid pressure to said control valve and communicating said first and second conduit means together and with said reservoir, and when moved beyond said another position against a reaction force cutting off communication of said first conduit means with said reservoir and opening a restricted communication between said pressure-producing means and reservoir and a free communication between said pressure-producing means and first conduit means.

11. In a hydraulic lift system having a double-acting cylinder containing a piston, first and second conduit means respectively communicating with the opposite sides of said piston and a control valve for alternatively communicating pressure from an inlet port to said first and second conduit means: valve means actuated independently of said control valve adapted in one condition to communicate hydraulic pressure to said inlet port and in another condition to communicate said first and second conduit means with each other and with a discharge reservoir, anti-slip means located on said first conduit means for modulating pressure against the corresponding side of said piston only, spring means tending to restore said anti-slip means into an inoperative position, and pressure reaction means constructed for exerting on said anti-slip means a pressure force biasing it into inoperative position and increasing in relation with the pressure in said first conduit means.

12. In a hydraulic lift system, valve means having a valve bore formed with a pressure inlet port, an outlet port leading to a cylinder control valve, a first by-pass port leading to a cylinder chamber, a discharge port leading to a discharge reservoir, a return port from a piloted discharge valve, a second by-pass port, a control port from said control valve, a piloted valve control port, and a manually-actuated spool member slidable in the bore and formed with first, second and third lands; when in normal position, said first land closing off said first by-pass port, said second land communicating said control port and second by-pass port while cutting off said second by-pass port from said return port, and said third land closing off said piloted valve control port; when in a first operative position said first land closing off said outlet port, said second land opening free communication between said by-pass ports and said return port, and said third land cutting off communication between said second by-pass port and said piloted valve control port while connecting the latter with the reservoir; when brought beyond said first operative position, said second land restricting communication between said pressure port and said return port while maintaining unrestricted communication between said first and second by-pass ports and said discharge and return ports, respectively.

13. In a hydraulic lift system as set forth in claim 12, wherein a piloted discharge valve has a valve member which is forced off its seat to communicate pressure and return lines, leading to said pressure inlet and return ports respectively, when said piloted valve control port communicating with the rear face of the valve member is connected to the discharge port.

14. In a hydraulic lift system according to claim 12, pressure reaction means associated with said valve means comprising a chamber limited by the bore end and an enlarged end portion of the valve spool and a drilling in the valve spool communicating said chamber with the periphery of said second land.

References Cited in the file of this patent

UNITED STATES PATENTS

| | | |
|---|---|---|
| 2,573,943 | Ziskal | Nov. 6, 1951 |
| 2,874,682 | Vander Kaay | Feb. 24, 1959 |
| 2,886,948 | Pomper | May 19, 1959 |